US010445190B2

(12) United States Patent
Li

(10) Patent No.: US 10,445,190 B2
(45) Date of Patent: Oct. 15, 2019

(54) METHOD AND SYSTEM FOR ENHANCING BACKUP EFFICIENCY BY BYPASSING ENCODING AND DECODING

(71) Applicant: Alibaba Group Holding Limited, George Town, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 164 days.

(21) Appl. No.: 15/807,041

(22) Filed: Nov. 8, 2017

(65) Prior Publication Data

US 2019/0138403 A1 May 9, 2019

(51) Int. Cl.
G06F 11/10 (2006.01)
G06F 11/14 (2006.01)

(52) U.S. Cl.
CPC ...... G06F 11/1466 (2013.01); G06F 11/1004 (2013.01); G06F 11/1076 (2013.01)

(58) Field of Classification Search
CPC .................. G06F 11/1402; G06F 11/1466
USPC .......................................................... 714/20
See application file for complete search history.

(56) References Cited

U.S. PATENT DOCUMENTS

| 4,775,932 | A | 10/1988 | Oxley |
| 6,226,650 | B1 | 5/2001 | Mahajan et al. |
| 7,565,454 | B2 | 7/2009 | Zuberi |
| 8,260,924 | B2 | 9/2012 | Koretz |
| 8,452,819 | B1 | 5/2013 | Sorenson, III |
| 8,516,284 | B2 | 8/2013 | Chan |
| 9,043,545 | B2 | 5/2015 | Kimmel |
| 9,088,300 | B1 * | 7/2015 | Chen ................... H03M 13/091 |
| 9,092,223 | B1 | 7/2015 | Pani |
| 9,588,698 | B1 | 3/2017 | Karamcheti |
| 9,588,977 | B1 | 3/2017 | Wang |

(Continued)

FOREIGN PATENT DOCUMENTS

| JP | 2003022209 | 1/2003 |
| JP | 2011175422 | 9/2011 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

(Continued)

*Primary Examiner* — Chae M Ko
(74) *Attorney, Agent, or Firm* — Shun Yao; Park, Vaughan, Fleming & Dowler LLP

(57) ABSTRACT

One embodiment facilitates data backup on at least one storage device. During operation, the system decodes, by a computing device, based on an error correction code, a first difference between a first and a second set of data to obtain a codeword, wherein the first set of data indicates a backup version and the second set of data indicates subsequent modifications to the first set of data. The system calculates a value based on a second difference between a first signature for the first set of data and a second signature for the second set of data. In response to determining that a decoding of the codeword based on a cyclic redundancy check matches the calculated value, the system stores the codeword on the at least one storage device.

20 Claims, 11 Drawing Sheets

(56) References Cited

U.S. PATENT DOCUMENTS

| | | | |
|---|---|---|---|
| 2002/0010783 A1 | 1/2002 | Primak | |
| 2002/0073358 A1* | 6/2002 | Atkinson | G06F 9/4418 714/21 |
| 2002/0161890 A1 | 10/2002 | Chen | |
| 2004/0010545 A1 | 1/2004 | Pandya | |
| 2004/0255171 A1 | 12/2004 | Zimmer | |
| 2004/0268278 A1 | 12/2004 | Hoberman | |
| 2005/0038954 A1 | 2/2005 | Saliba | |
| 2005/0097126 A1 | 5/2005 | Cabrera | |
| 2005/0177755 A1 | 8/2005 | Fung | |
| 2005/0195635 A1 | 9/2005 | Conley | |
| 2005/0235171 A1 | 10/2005 | Igari | |
| 2006/0156012 A1 | 7/2006 | Beeson | |
| 2007/0033323 A1 | 2/2007 | Gorobets | |
| 2009/0113219 A1* | 4/2009 | Aharonov | G06F 21/64 713/193 |
| 2009/0282275 A1 | 11/2009 | Yermalayeu | |
| 2009/0307249 A1 | 12/2009 | Koifman | |
| 2010/0229224 A1 | 9/2010 | Etchegoyen | |
| 2010/0325367 A1 | 12/2010 | Kornegay | |
| 2011/0055458 A1 | 3/2011 | Kuehne | |
| 2011/0153903 A1 | 6/2011 | Hinkle | |
| 2011/0218969 A1 | 9/2011 | Anglin | |
| 2011/0231598 A1 | 9/2011 | Hatsuda | |
| 2011/0292538 A1 | 12/2011 | Haga | |
| 2011/0302353 A1 | 12/2011 | Confalonieri | |
| 2012/0084523 A1 | 4/2012 | Littlefield | |
| 2012/0117399 A1 | 5/2012 | Chan | |
| 2012/0159289 A1* | 6/2012 | Piccirillo | G06F 1/30 714/799 |
| 2012/0210095 A1 | 8/2012 | Nellans | |
| 2012/0246392 A1 | 9/2012 | Cheon | |
| 2013/0073798 A1 | 3/2013 | Kang | |
| 2013/0145085 A1 | 6/2013 | Yu | |
| 2013/0145089 A1 | 6/2013 | Eleftheriou | |
| 2013/0159251 A1 | 6/2013 | Skrenta | |
| 2013/0166820 A1 | 6/2013 | Batwara | |
| 2013/0173845 A1 | 7/2013 | Aslam | |
| 2013/0219131 A1 | 8/2013 | Alexandron | |
| 2013/0318283 A1 | 11/2013 | Small | |
| 2014/0108414 A1 | 4/2014 | Stillerman | |
| 2014/0233950 A1 | 8/2014 | Luo | |
| 2014/0250259 A1 | 9/2014 | Ke | |
| 2014/0310574 A1 | 10/2014 | Yu | |
| 2014/0359229 A1 | 12/2014 | Cota-Robles | |
| 2014/0365707 A1 | 12/2014 | Talagala | |
| 2015/0019798 A1 | 1/2015 | Huang | |
| 2015/0082317 A1 | 3/2015 | You | |
| 2015/0106556 A1 | 4/2015 | Yu | |
| 2015/0142752 A1 | 5/2015 | Chennamsetty | |
| 2015/0372597 A1 | 12/2015 | Luo | |
| 2016/0098344 A1 | 4/2016 | Gorobets | |
| 2016/0110254 A1 | 4/2016 | Cronie | |
| 2016/0232103 A1 | 8/2016 | Schmisseur | |
| 2016/0239074 A1 | 8/2016 | Lee | |
| 2016/0239380 A1 | 8/2016 | Wideman | |
| 2016/0343429 A1 | 11/2016 | Nieuwejaar | |
| 2016/0350002 A1 | 12/2016 | Vergis | |
| 2017/0109232 A1* | 4/2017 | Cha | G06F 11/106 |
| 2017/0162235 A1 | 6/2017 | De | |
| 2017/0168986 A1 | 6/2017 | Sajeepa | |
| 2017/0212708 A1 | 7/2017 | Suhas | |
| 2017/0228157 A1 | 8/2017 | Yang | |
| 2017/0344470 A1 | 11/2017 | Yang | |
| 2017/0353576 A1 | 12/2017 | Guim Bernat | |
| 2018/0024772 A1 | 1/2018 | Madraswala | |
| 2018/0088867 A1 | 3/2018 | Kaminaga | |
| 2018/0329776 A1* | 11/2018 | Lai | G06F 11/1068 |
| 2019/0012111 A1* | 1/2019 | Li | G06F 3/0655 |
| 2019/0073262 A1* | 3/2019 | Chen | H03M 13/1108 |

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

* cited by examiner

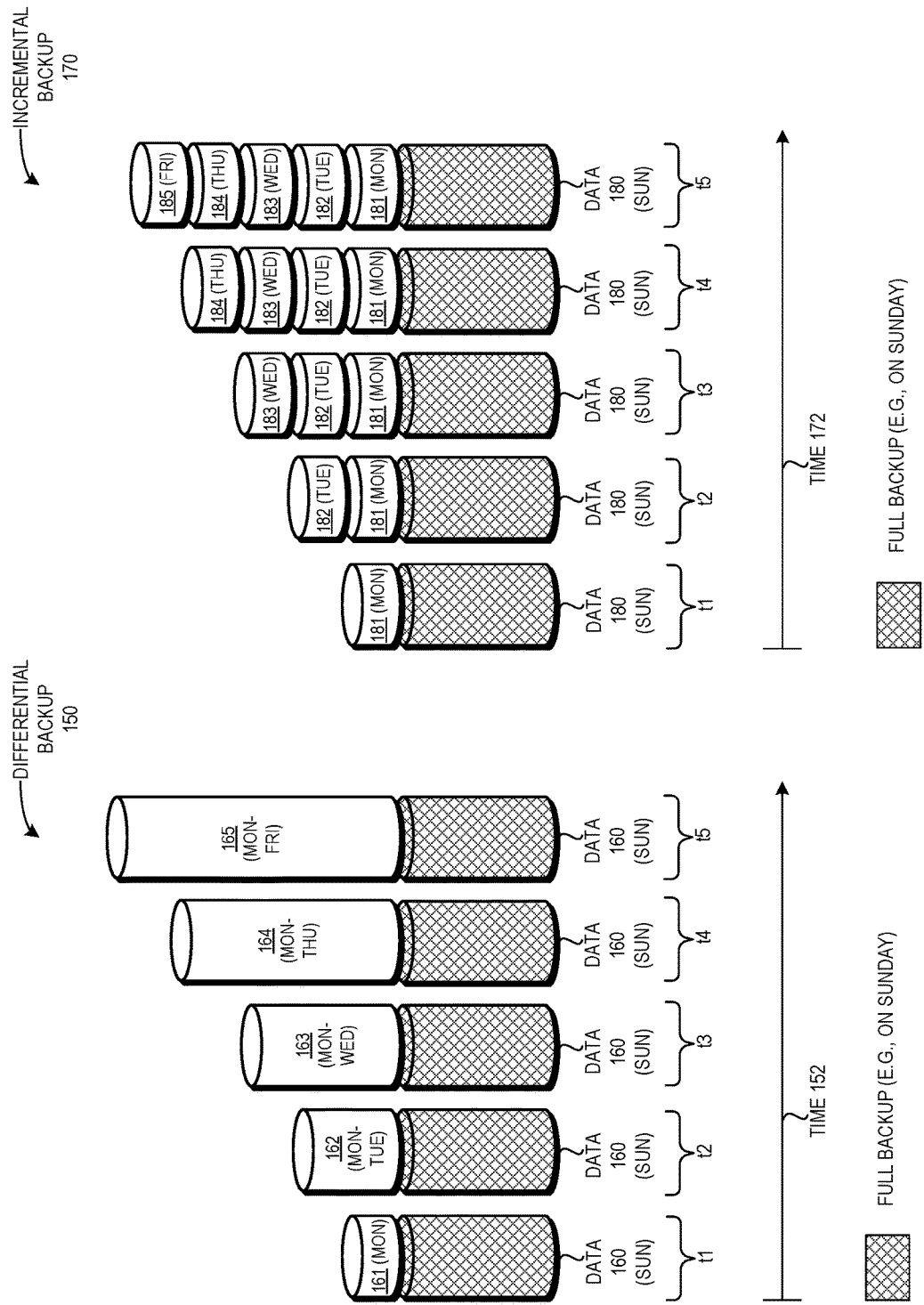

METHOD AND SYSTEM FOR ENHANCING BACKUP EFFICIENCY BY BYPASSING ENCODING AND DECODING

BACKGROUND

Field

This disclosure is generally related to the field of data storage. More specifically, this disclosure is related to a method and system for enhancing the efficiency of backup procedures by bypassing the encoding and decoding associated with error correction and parity check.

Related Art

The proliferation of the Internet and e-commerce continues to create a vast amount of digital content. Distributed storage systems and servers have been created to access and store such digital content. To secure the integrity of stored data (e.g., to counteract unpredictable events such as a system malfunction, a hacker attack, a virus infection, etc.), a system can provide functionality to back up the stored data, thus allowing the system to quickly return to a working state at a prior moment in time (e.g., when the most recent snapshot is taken). Backing up a large amount of data may consume considerable resources in both time and power, depending on the backup method. Examples of backup methods include a full backup, a differential backup, and an incremental backup. In a full backup, the system stores all of its data at any given time. Due to the high volume of duplicated data that may exist between full backups on the same system, performing a full backup on a large amount of data can consume a considerable amount of resources. In a differential backup, the system stores all of its data at a given time (i.e., a full backup), and then stores subsequent changes to all items changed since the last full backup. In an incremental backup, the system stores all of its data at a given time (i.e., a full backup), and then, as an incremental backup, stores subsequent changes to all items changed since the last incremental backup.

While an incremental backup and a differential backup may consume fewer resources than a full backup, the system must still perform multiple encoding and decoding operations, which can further consume resources and decrease the efficiency of the system.

SUMMARY

One embodiment facilitates data backup on at least one storage device. During operation, the system decodes, by a computing device, based on an error correction code, a first difference between a first and a second set of data to obtain a codeword, wherein the first set of data indicates a backup version and the second set of data indicates subsequent modifications to the first set of data. The system calculates a value based on a second difference between a first signature for the first set of data and a second signature for the second set of data. In response to determining that a decoding of the codeword based on a cyclic redundancy check matches the calculated value, the system stores the codeword on the at least one storage device. The system thus facilitates efficient data backup by reducing the number of encoding and decoding operations.

In some embodiments, the system obtains the first difference based on a bit-wise XOR of the first set of data and the second set of data.

In some embodiments, the system obtains the second difference based on a bit-wise XOR of the first signature and the second signature, wherein calculating the value is further based on a polynomial division of the second difference.

In some embodiments, the first signature is a cyclic redundancy check signature for the first set of data, and the second signature is a cyclic redundancy check signature for the second set of data.

In some embodiments, determining that the decoding of the codeword based on the cyclic redundancy check matches the calculated value is based on a bit-wise check between the decoded codeword and the calculated value.

In some embodiments, in response to determining that the decoding of the codeword based on the cyclic redundancy check does not match the calculated value, the system obtains a newly decoded codeword by: reading the first set and the second set of data from the at least one storage device to obtain a new codeword, or adjusting the codeword or the new codeword; and decoding the codeword or the new codeword based on the error correction code. In response to determining that a decoding of the newly decoded codeword based on the cyclic redundancy check matches the calculated value, the system stores the newly decoded codeword on the at least one storage device.

In some embodiments, the system determines an accumulated difference between the second set of data and one or more additional sets of data, wherein an additional set of data indicates subsequent modifications to the first set of data. The system decodes, based on the error correction code, a third difference between the first set of data and the accumulated difference to obtain the codeword, wherein calculating the value is further based on one or more signatures for the one or more additional sets of data.

In some embodiments, the system accumulates, by a multiplexing component, the second set of data and the one or more additional sets of data, wherein the multiplexing component is a switch which suspends the accumulation or modifies an order of the accumulation.

In some embodiments, the third difference is decoded prior to determining the accumulated difference between the second set of data and all of the additional sets of data.

In some embodiments, in response to determining that the decoding of the codeword based on the cyclic redundancy check does not match the calculated value, the system decodes, based on the error correction code, a fourth difference between the second set of data and a decreased number of the additional sets of data to obtain a newly decoded codeword, wherein calculating the value is further based on corresponding signatures for the decreased number of the additional sets of data. In response to determining that a decoding of the newly decoded codeword based on the cyclic redundancy check matches the calculated value, the system stores the newly decoded codeword on the at least one storage device.

BRIEF DESCRIPTION OF THE FIGURES

FIG. 1B illustrates an exemplary diagram of a differential backup, in accordance with an embodiment of the present application.

FIG. 1C illustrates an exemplary diagram of an incremental backup, in accordance with an embodiment of the present application.

In the figures, like reference numerals refer to the same figure elements.

DETAILED DESCRIPTION

Figure 1A:
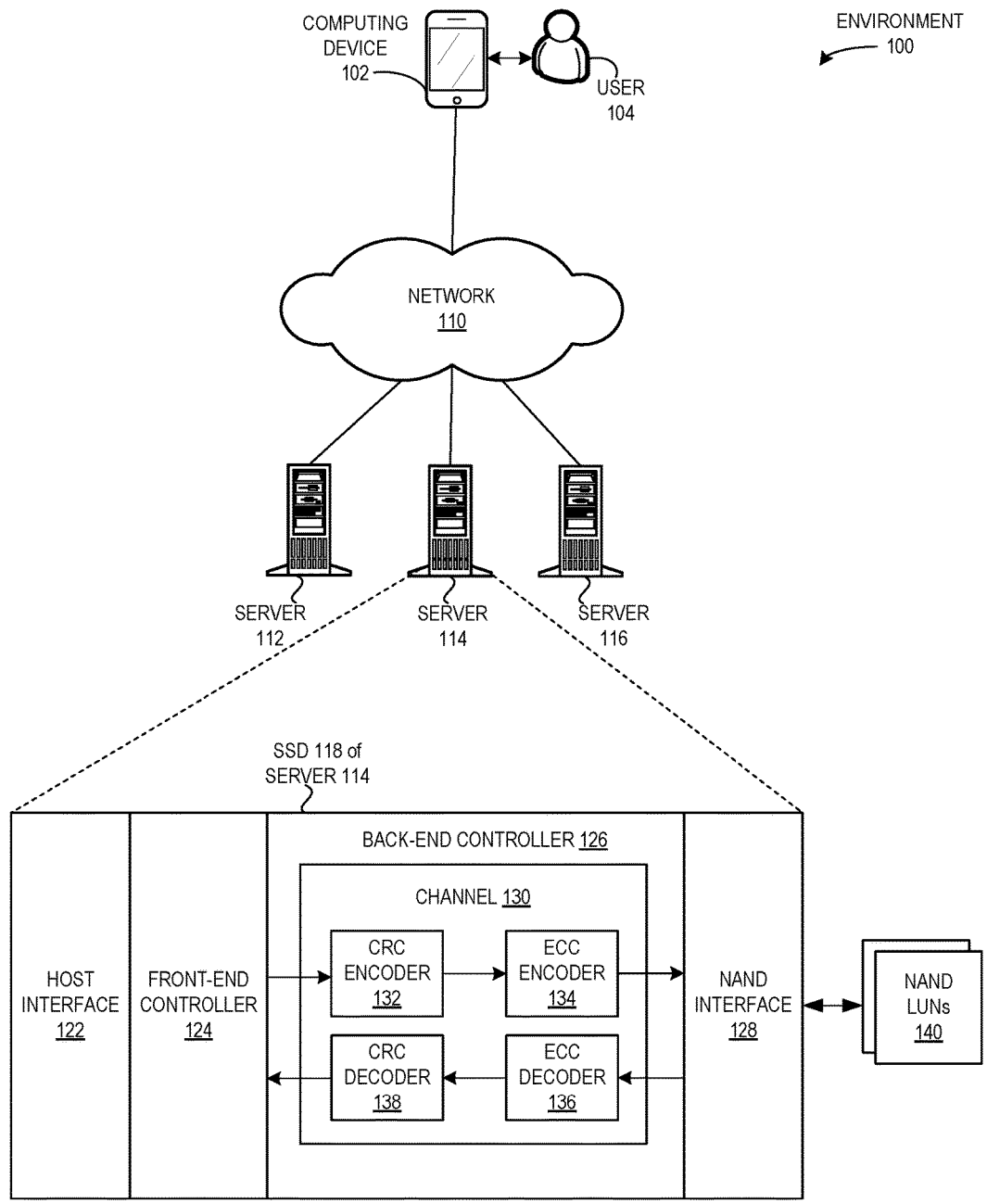
FIG. 1A illustrates an exemplary environment that facilitates data backup on a storage device, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which solves the problem of facilitating efficient data backup by reducing the number of encoding and decoding operations. As described above, while an incremental backup and a differential backup may consume fewer resources than a full backup, the system must still perform multiple encoding and decoding operations, which can consume resources and decrease the efficiency of the system. For example, in an incremental or differential backup, the conventional system can store both a reference version (i.e., the full backup) and the current version (i.e., subsequent changes) of the data. To store each version, the conventional system encodes the data twice (first based on a cyclic redundancy check (CRC) and second based on an error correction code (ECC)) and writes the twice-encoded data to the storage drive. The raw (i.e., not encoded) data is in a "host format" while the encoded and stored data is in a "media format." To determine the difference between the reference version and the current version (the "delta data"), the conventional system reads out both the reference version and the current version, decodes the respective data twice (first based on the ECC and second based on the CRC), and performs a bit-wise XOR to determine the delta data. Subsequently, the conventional system again encodes the delta data twice (i.e., CRC and ECC) and writes the twice-encoded delta data to the storage drive. Determining the delta data in the prior art is described below in relation to FIG. 2.

Furthermore, in an incremental or differential backup, the conventional system rebuilds the full backup by twice-decoding (i.e., ECC and CRC) each version of data, accumulating the multiple sets of twice-decoded data to determine the delta difference, and twice-encoding (i.e., CRC and ECC) the delta difference before writing it to the storage drive. Rebuilding a full backup in the prior art is described below in relation to FIG. 3.

Thus, the conventional system can include a very large number of encoding and decoding operations, which can result in an inefficient system. The embodiments described herein provide a system which improves the efficiency of backing up data by reducing the number of encoding and decoding operations. The system uses a simplified data processing to generate the difference between versions in an incremental and a differential backup, as well as to rebuild the full backup using more efficient operations. Rather than retrieving and converting the data back to the host format to obtain the difference, the embodiments described herein use the bit streams as immediately read out from the drives in the media format.

To determine the delta data between two versions, the system need only perform ECC-decoding (and minimal CRC-decoding) on a difference between a reference version and a "difference" version (e.g., a current version or an incremental version) to obtain a noisy codeword (i.e., only ECC-decoded). The system can calculate a value based on the difference between the CRC signatures of the two versions. Subsequently, the system can determine whether the CRC-decoded noisy codeword matches the calculated value, before writing the data to the storage drive, as described below in relation to FIG. 4. This obviates the need for CRC-encoding and ECC-encoding, and also greatly reduces the number of decoding operations required (both ECC and CRC).

To rebuild the full backup, the system need only accumulate the difference between "difference" versions, and determine the delta data between the reference version and the difference versions to obtain the noisy codeword (i.e., only ECC-decoded). The system can calculate a value based on the difference between the CRC signatures for the reference version and the difference versions. Subsequently, the system can determine whether the CRC-decoded noisy codeword matches the calculated value, before writing the full backup to the storage drive, as described below in relation to FIG. 5.

Thus, the embodiments described herein provide a system which increases the efficiency of a storage system. The increased efficiency can include an improved performance in data backup, such as in an incremental backup and a differential backup. By using the bit streams as immediately read out from data drives in the media format, the system reduces the number of encoding and decoding operations required both to determine a difference between two versions (e.g., a reference version and a current version) and to rebuild a full backup (e.g., based on a reference version and multiple incremental current or "difference" versions). As a result, the embodiments described herein can provide an improved and more efficient storage system.

The terms "storage drive," "storage component," and "storage device" refer to an entity to which data may be written for persistent storage, and may be used interchangeably. The term "storage server" or "storage system" refers to a server which can have multiple storage drives, storage components, or storage devices.

The terms "storage-controlling module," "storage controller," and "controller" refer to a module or component located within a drive, and may be used interchangeably.

The term "ECC-encoding" refers to encoding data based on an error correction code, while the term "ECC-decoding" refers to decoding data based on the error correction code. An "ECC encoder/decoder" is a module which performs ECC-encoding/decoding.

The term "CRC-encoding" refers to encoding data based on a cyclic redundancy check, while the term "CRC-decoding" refers to decoding data based on the cyclic redundancy check. A "CRC encoder/decoder module" is a module which performs CRC-encoding/decoding.

The term "host format" refers to data in a format as received from the host, and that is readable by the host, which can include raw data and data which has not been encoded.

The term "media format" refers to data in a format as stored on or received from a physical media or storage device, and that is readable by the physical media or the storage device. This data can include data encoded based on one or both of ECC and CRC.

The term "differential backup" refers to storing all of a system's data at a given time (i.e., a full backup), and then storing subsequent changes to all items changed since the last full backup. The term "incremental backup" refers to storing all of a system's data at a given time (i.e., a full backup), and then, as an incremental backup, storing subsequent changes to all items changed since the last incremental backup (e.g., based on predetermined increments such as days since the last incremental backup).

The term "reference version" refers to a full backup of data at a given time. The terms "current version," "difference version," and "incremental version" refer to subsequent modifications to a reference version.

The term "delta data" refers to a difference between two or more sets (or versions) of data.

Exemplary Environment

FIG. 1A illustrates an exemplary environment 100 that facilitates data backup on a storage device, in accordance with an embodiment of the present application. Environment 100 can include a computing device 102 which is associated with a user 104. Computing device 102 can include, for example, a tablet, a mobile phone, an electronic reader, a laptop computer, a desktop computer, or any other computing device. Computing device 102 can communicate via a network 110 with storage servers 112, 114, and 116 (which can be part of a distributed storage system). A storage server can include multiple storage drives (or devices), and each drive can include a controller and multiple physical media for data storage.

For example, storage server 114 can include a storage device, such as an SSD 118. SSD 118 can include: a host interface 122 via which SSD 118 can communicate with a host; a front-end controller 124 for managing the data via host interface 122; a back-end controller 126 with a channel 130 which can include encoder and decoder modules (i.e., CRC encoder 132, ECC encoder 134, ECC decoder 136, and CRC decoder 138); and a NAND interface 128 via which SSD 118 can communicate with physical media (e.g., NAND LUNs 140). An exemplary communication via a channel is described below in relation to FIG. 4.

FIG. 1B illustrates an exemplary diagram 150 of a differential backup, in accordance with an embodiment of the present application. Time 152 is represented in a horizontal manner. Data 160 can include a full backup or a backup version, e.g., on Sunday. At each time period or interval subsequent to the time the full backup is stored, the system can store the subsequent modifications made since the full backup. For example, on each day subsequent to Sunday, the system can store the subsequent modifications to the backup made since the last full backup (e.g., since Sunday). For example, on Monday at a time t1, the system can store data 161, which includes the subsequent modifications made since Sunday (on Monday). On Tuesday at a time t2, the system can store data 162, which includes the subsequent modifications made since Sunday (on Monday and Tuesday, inclusive). On Wednesday at a time t3, the system can store data 163, which includes the subsequent modifications made since Sunday (on Monday through Wednesday, inclusive). On Thursday at a time t4, the system can store data 164, which includes the subsequent modifications made since Sunday (on Monday through Thursday, inclusive). On Friday at a time t5, the system can store data 165, which includes the subsequent modifications made since Sunday (on Monday through Friday, inclusive).

FIG. 1C illustrates an exemplary diagram 170 of an incremental backup, in accordance with an embodiment of the present application. Time 172 is represented in a horizontal manner. Data 180 can include a full backup or a backup version, e.g., on Sunday. At each time period or interval subsequent to the time the full backup is stored, the system can store (as an incremental backup) the subsequent modifications made since the last incremental backup. For example, on each day subsequent to Sunday, the system can store the subsequent modifications to the backup made since the last incremental backup (e.g., since the prior day). For example, on Monday at a time t1, the system can store data 181, which includes the subsequent modifications made since Sunday (on Monday). On Tuesday at a time t2, the system can store data 182, which includes the subsequent modifications made since Monday (on Tuesday). On Wednesday at a time t3, the system can store data 183, which includes the subsequent modifications made since Tuesday (on Wednesday). On Thursday at a time t4, the system can store data 184, which includes the subsequent modifications made since Wednesday (on Thursday). On Friday at a time t5, the system can store data 185, which includes the subsequent modifications made since Thursday (on Friday).

Figure 2:
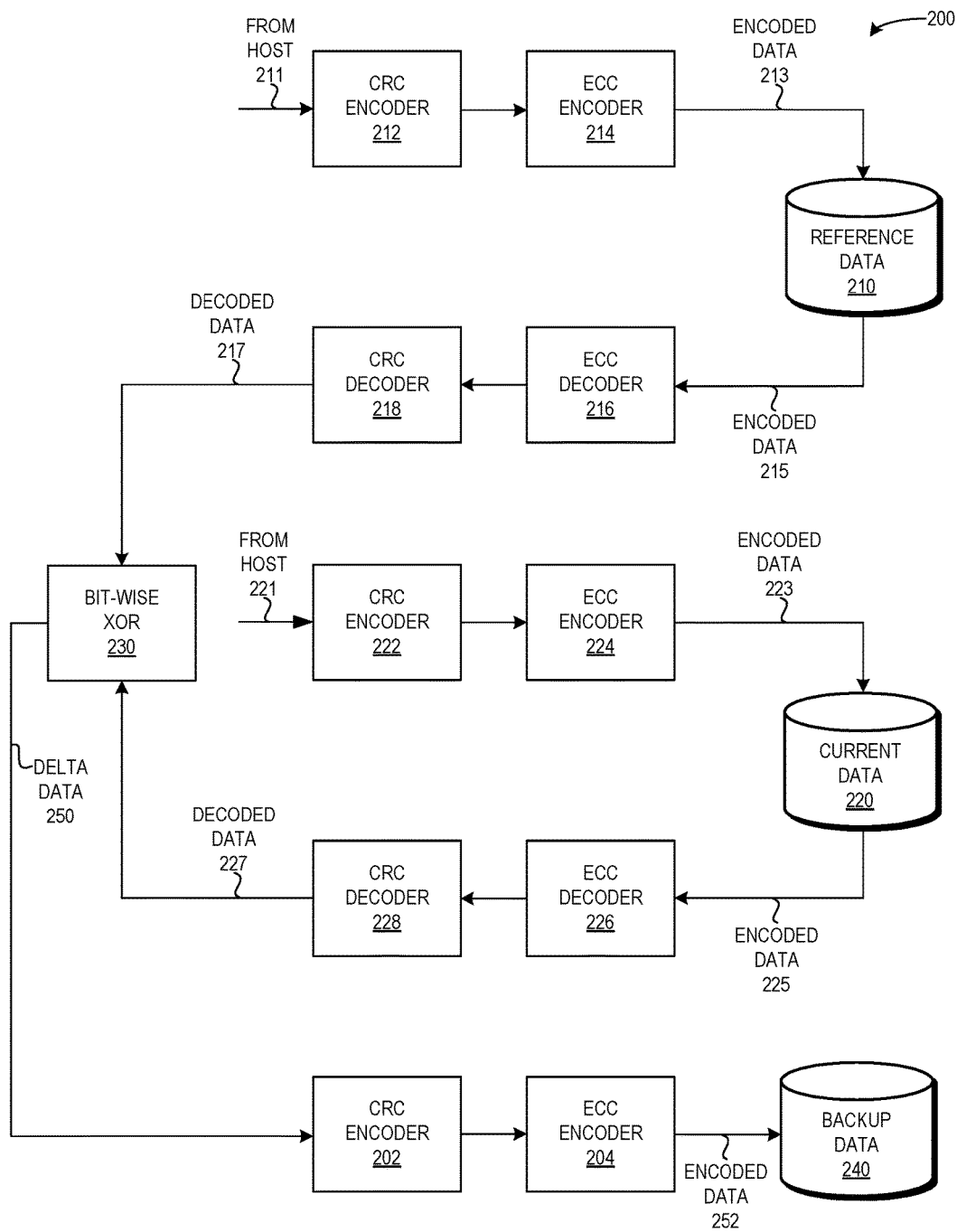
FIG. 2 illustrates an exemplary communication for obtaining a difference between two data sets, in accordance with the prior art.

Exemplary Communication in the Prior Art for Obtaining a Difference Between Two Data Sets FIG. 2 illustrates an exemplary communication 200 for obtaining a difference between two data sets, in accordance with the prior art. During operation, a conventional system can encode data to be stored (from the host format to the media format) and decode the retrieved stored data (from the media format to the host format) for each version to be compared. The conventional system can compare the decoded versions (in the host format) to obtain a delta difference (in the host format), and subsequently encode the delta difference (to the media format) for storage in the physical media.

For example, the conventional system can receive data to be stored from the host (via a communication 211). CRC encoder 212 can perform a CRC-encoding of the data, and ECC encoder 214 can perform an ECC-encoding of the CRC-encoded data to obtain encoded data 213, which is stored as reference data 210 (i.e., the reference version or the full backup) on a physical media. Similarly, the conventional system can receive data to be stored (i.e., subsequent changes to reference data 210) from the host (via a communication 221). CRC encoder 222 can perform a CRC-encoding of the data, and ECC encoder 224 can perform an ECC-encoding of the CRC-encoded data to obtain encoded data 223, which is stored as current data 220 (i.e., the current or incremental version) on the physical media.

To determine the difference between reference data 210 and current data 220, the conventional system can retrieve and decode the respective encoded data. For example, the conventional system can retrieve encoded data 215 from reference data 210. ECC decoder 216 can perform an ECC-decoding of the data, and CRC decoder 218 can perform a CRC-decoding of the ECC-decoded data to obtain decoded data 217. Similarly, the conventional system can retrieve encoded data 225 from current data 220. ECC decoder 226 can perform an ECC-decoding of the data, and CRC decoder 228 can perform a CRC-decoding of the ECC-decoded data to obtain decoded data 227.

Subsequently, the conventional system can perform a bit-wise XOR 230 of decoded data 217 and decoded data 227 to obtain a delta data 250. CRC encoder 202 can perform a CRC-encoding of delta data 250, and ECC encoder 204 can perform an ECC-encoding of CRC-encoded delta data 250 to obtain encoded data 252, which is stored as backup data 240 on the physical media.

Thus, the conventional system includes multiple encoding and decoding operations when determining the difference between two data sets, which can result in an inefficient system.

Figure 3:
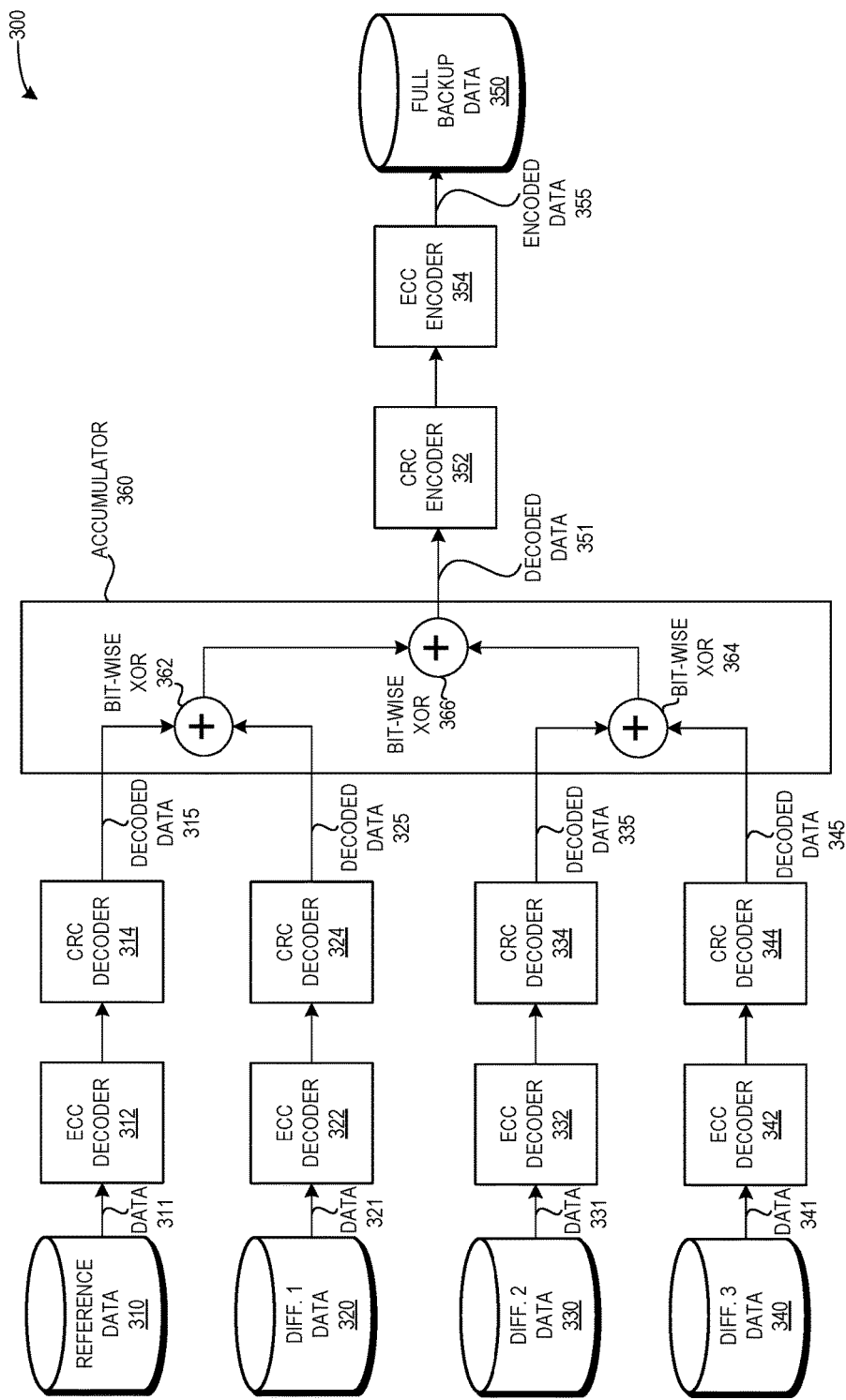
FIG. 3 illustrates an exemplary communication for rebuilding a full backup using differences between data sets, in accordance with the prior art.

Exemplary Communication in the Prior Art for Rebuilding a Full Backup Using Differences in Data Sets FIG. 3 illustrates an exemplary communication 300 for rebuilding a full backup using differences between data sets, in accordance with the prior art. During operation, a conventional system can retrieve and decode stored data (from the media format to the host format) for each "difference" version to be used in rebuilding the full backup. The conventional system can accumulate the differences using multiple bit-wise XOR's to obtain the delta difference, and subsequently encode the delta difference (back to the host format) for storage in the physical media.

Communication 300 can include a conventional system in an incremental backup. The conventional system can include: reference data 310, which is a full backup taken on Sunday; difference 1 data 320, which is an incremental backup of changes made on Monday; difference 2 data 330, which is an incremental backup of changes made on Tuesday; and difference 3 data 340, which is an incremental backup of changes made on Wednesday. The conventional system can retrieve (encoded in the media format) data 311 from reference data 310. ECC decoder 312 can perform an ECC-decoding of data 311, and CRC decoder 314 can perform a CRC-decoding of the ECC-decoded data 311 to obtain decoded data 315. Similarly, the conventional system can retrieve (encoded in the media format) data 321, 331, and 341 from, respectively, difference 1 data 320, difference 2 data 330, and difference 3 data 340. ECC decoders 322, 332, and 342 can perform an ECC-decoding of, respectively, data 321, 331, and 341, and CRC decoders 324, 334, and 344 can perform a CRC-decoding of, respectively, the ECC-decoded data 321, 331, and 341 to obtain, respectively, decoded data 325, 335, and 345. Accumulator 360 can accumulate decoded data 315, 325, 335, and 345, and perform multiple bit-wise XORs (e.g., operations 362, 364, and 366) to obtain decoded data 351. CRC encoder 352 can perform a CRC-encoding of data 351, and ECC encoder 354 can perform an ECC-encoding of CRC-encoded data 351 to obtain encoded data 355, which is stored as full backup data 350 on the physical media.

Thus, the conventional system includes multiple encoding and decoding operations when rebuilding a full backup from a reference version and multiple "difference" or incremental versions, which can result in an inefficient system.

Exemplary Communication for Obtaining a Difference Between Two Data Sets

Figure 4:
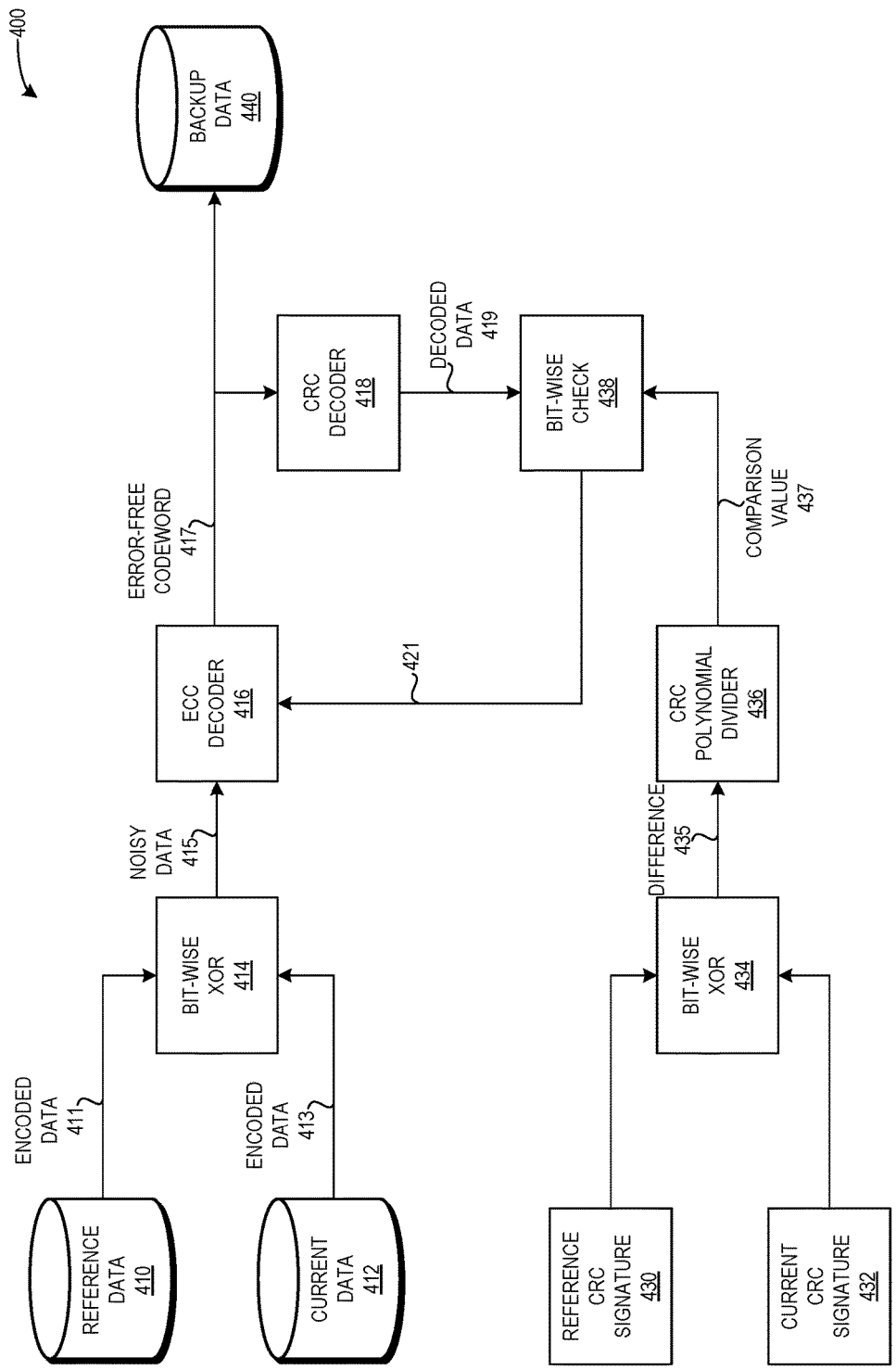
FIG. 4 illustrates an exemplary communication for obtaining a difference between two data sets, in accordance with an embodiment of the present application.

FIG. 4 illustrates an exemplary communication 400 for obtaining a difference between two data sets, in accordance with an embodiment of the present application. Rather than first retrieving the host-formatted data and then twice-decoding (i.e., ECC and CRC) to perform a comparison and obtain the difference (as in FIGS. 2 and 3), in communication 400, the system can perform a comparison directly on the bit stream retrieved from the physical media, e.g., data in the media format from each of backup ("reference") data and subsequently modified ("current") data, to obtain noisy data. The system can perform ECC-decoding only on the noisy data to correct potential errors from reading the data out of the channel, to obtain an error-free codeword. The error-free codeword includes a user portion, which is the difference between the data read out from the physical media. This difference is encoded (i.e., has been encoded naturally) and is ready to be written to the physical media. However, the system must first check the signature of the error-free codeword to avoid ECC convergence onto an incorrect codeword. Thus, the system can perform a CRC-decoding on the error-free codeword to obtain a first comparison value, and obtains a second comparison value as described below.

The can use takes one codeword from the reference data and one codeword from the current data (where both codewords are encoded with the same CRC), and generate a CRC signature for each codeword which is a residual. The system can sum the residuals, e.g., by performing a bit-wise XOR, and subsequently divide with a polynomial again to obtain a new residual (i.e., the second comparison value). Under the information theory basis of the linearity of the Galois Field, the CRC of the difference calculated directly from the error-free codeword (e.g., the first comparison value) should be the same as the new residual which is calculated based on the difference between the CRC signatures for the data used to generate the error-free codeword (e.g., the second comparison value).

If the system determines that the two comparison values do not match, indicating that the ECC-decoding has converged onto an incorrect codeword and thus fails the CRC check, the system can perform the ECC-decoding again, either by re-reading the data from the physical media or by adjusting the data to obtain a successful ECC-decoding. When the two comparison values match, the system can write the error-free codeword to the physical media. Note that no CRC-encoding or ECC-encoding is required to save the obtained difference (i.e., the error-free codeword) back to the media format.

Specifically, in communication 400, the system can retrieve encoded data 411 from reference data 410, and retrieve encoded data 413 from current data 412. The system can perform a bit-wise XOR 414 directly on encoded data 411 and 413 to obtain noisy data 415. ECC decoder 416 can perform an ECC-decoding on noisy data 415 to obtain an error-free codeword 417 (i.e., noisy codeword 417). CRC decoder 418 can perform a CRC-decoding on noisy codeword 417 to obtain decoded data 419, which is the CRC signature calculated directed from the error-free (e.g., ECC-decoded) codeword 417. Decoded data 419 can be a "first comparison value." At the same time, the system can perform a bit-wise XOR 434 on a reference CRC signature 430 (which is the CRC signature for reference data 410) and a current CRC signature 432 (which is the CRC signature for current data 412) to obtain a difference 435. CRC polynomial divider 436 can divide the difference 435 by a polynomial to obtain a comparison value 437. Comparison value 437 can be a "second comparison value."

Subsequently, the system can check if the first comparison value matches the second comparison value. If so, the system can write error-free codeword 417 to the physical media, e.g., to backup data 440. If not, the system can re-read the data from the physical media (e.g., from reference data 410 and current data 412), or the system can adjust noisy data 415 to obtain a successful ECC-decoding (e.g., based on a notification or message via a communication 421). The system can thus obtain and compare new comparison values, until the comparison values match, at which point the system can write error-free codeword 417 to the physical media (e.g., backup data 440).

Thus, the embodiments described herein provide a system which significantly reduces the number of encoding and decoding operations required to both determine and write back to the physical media a difference between two sets of data, e.g., a reference version which is a full backup of data and a current version which includes subsequent modifications to the full backup. By reading the bit stream directly from the physical media and determining the difference on the media-formatted data, the system obviates the need for performing both an ECC-decoding and a CRC-decoding (to obtain host-formatted data) on every set of data read out from the physical media. In addition, by checking the decoded difference against a signature difference (e.g., the first and second comparison values, respectively), and by storing the error-free codeword (e.g., the ECC-decoded codeword) directly to the physical media, the system obviates the need for performing both CRC-encoding and ECC-encoding on the decoded difference. Thus, the system facilitates an enhanced backup method by bypassing these encoding and decoding operations, which can result in both improved speed and efficiency for the system.

Figure 5:
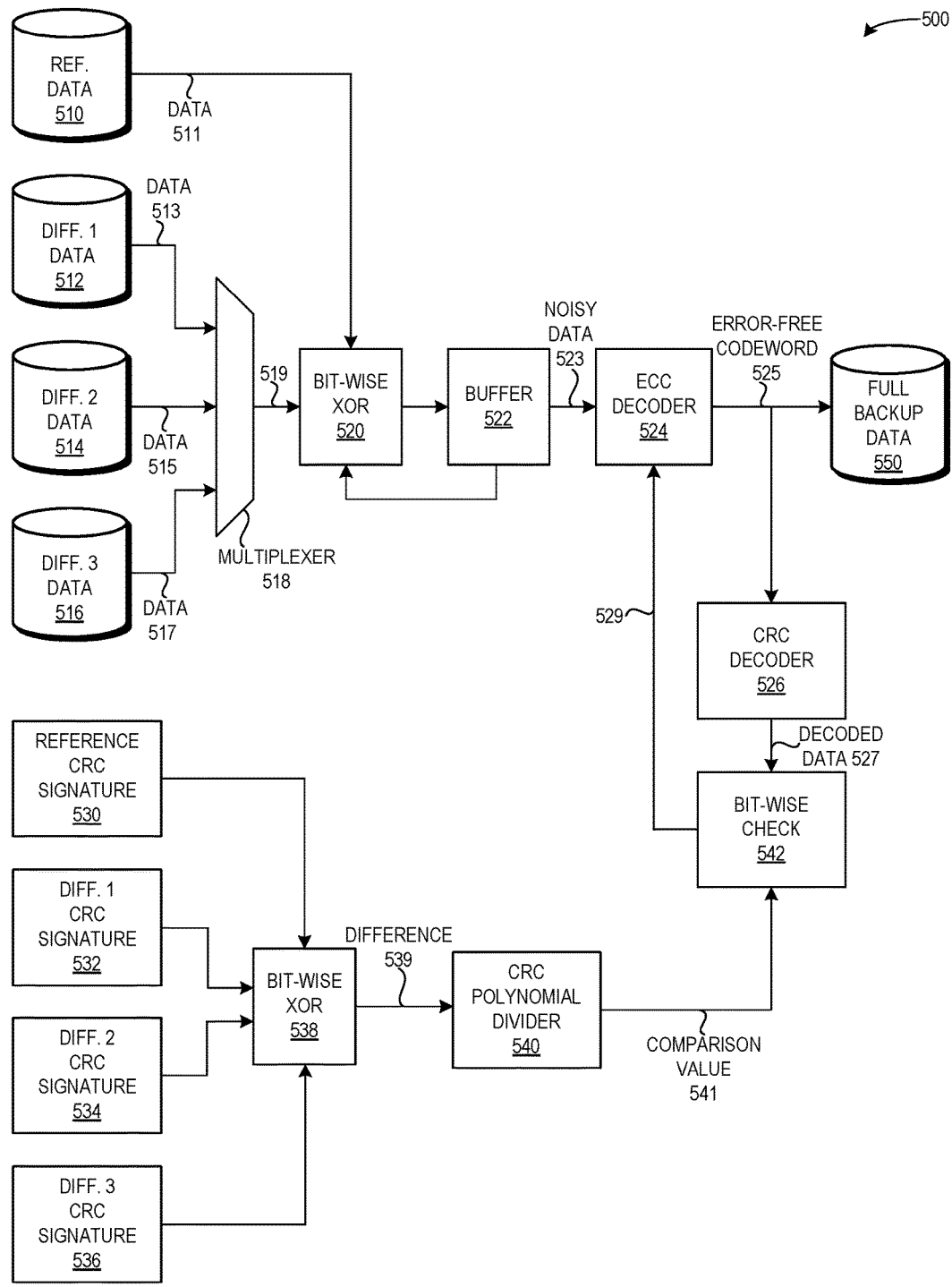
FIG. 5 illustrates an exemplary communication for rebuilding a full backup using differences between data sets, in accordance with an embodiment of the present application.

Exemplary Communication for Rebuilding a Full Backup Using Differences in Data Sets FIG. 5 illustrates an exemplary communication 500 for rebuilding a full backup using differences between data sets, in accordance with an embodiment of the present application. Similar to the above-described advantages of FIG. 4 over FIG. 2, communication 500 of FIG. 5 also provides advantages over communication 300 of FIG. 5. Rather than twice-decoding data retrieved from the physical media in the media format to obtain host-formatted data, the system can accumulate (i.e., determine the difference between) incremental differences and a full backup version without performing the full twice-decoding on the data. Similar to obtaining the two bit streams directly from the physical media in communication 400, the system of communication 500 can accumulate a noisy vector from multiple bit streams. The noisy vector is subsequently ECC-decoded for fixing errors to obtain an error-free codeword. As part of the CRC check, the system also performs a CRC-decoding on the error-free codeword to obtain a first comparison value. The system also accumulates the corresponding CRC signatures for the multiple bit streams and re-calculates the residual (via a polynomial division), to obtain a second comparison value. As in communication 4, the system compares the two comparison values and performs additional ECC-decoding until the comparison values match, at which point the error-free codeword is written to the physical media.

Specifically, in communication 500, the system can retrieve data 511 from reference data 510. A multiplexer 518 can retrieve data 513, 515, and 517 from, respectively, difference 1 data 512, difference 2 data 514, and difference 3 data 516. Multiplexer 518 can determine a delta data (data 519). The system can perform a bit-wise XOR 520 directly on data 511 and data 519, and use a buffer 522 to determine the difference (e.g., to obtain noisy data 523). ECC decoder 524 can perform an ECC-decoding on noisy data 523 to obtain an error-free codeword 525 (which is also a noisy codeword). CRC decoder 526 can perform a CRC-decoding on codeword 525 to obtain decoded data 527, which is the CRC signature calculated directed from the error-free (e.g., ECC-decoded) codeword 525. Decoded data 527 can be a "first comparison value."

The system can also perform a bit-wise XOR 538 on the CRC signatures from the corresponding data: a reference CRC signature 530 corresponding to reference data 510; a difference 1 CRC signature 532 corresponding to difference 1 data 512; a difference 2 CRC signature 534 corresponding to difference 2 data 514; and a difference 3 CRC signature 536 corresponding to difference 3 data 516. CRC polynomial divider 540 can divide the output from bit-wise XOR 538 (i.e., a difference 539) by a polynomial to obtain a comparison value 541. Comparison value 541 can be a "second comparison value."

Subsequently, the system can check if the first comparison value matches the second comparison value. If so, the system can write error-free codeword 525 to the physical media, e.g., to full backup data 550. If not, the system can re-read the data from the physical media (e.g., from data 510-516), or the system can adjust noisy data 523 to obtain a successful ECC-decoding (e.g., based on a notification or message via a communication 529). For example, multiplexer 518 can select a decreased number of data sets from which to determine a difference and obtain a new first comparison value, and the system can use the corresponding decreased number of CRC signatures to obtain a new second comparison value. Multiplexer 518 can be a switch which suspends the accumulation or modifies an order of the accumulation. The system can thus obtain and compare new comparison values, until the new comparison values match, at which point the system can write error-free codeword 525 to the physical media (e.g., full backup data 550).

Thus, the embodiments described herein provide a system which significantly reduces the number of encoding and decoding operations required to both determine and write back to the physical media a difference between two sets of data, e.g., a reference version which is a full backup of data and multiple incremental versions which each include subsequent modifications to the full backup (e.g., as in a differential or an incremental backup). The system thus facilitates an enhanced backup method by bypassing encoding and decoding operations (as described above in relation to FIG. 4), which can result in both improved speed and efficiency for the system.

Exemplary Architecture of a Controller for Improved Efficiency in Data Backup

Figure 6:
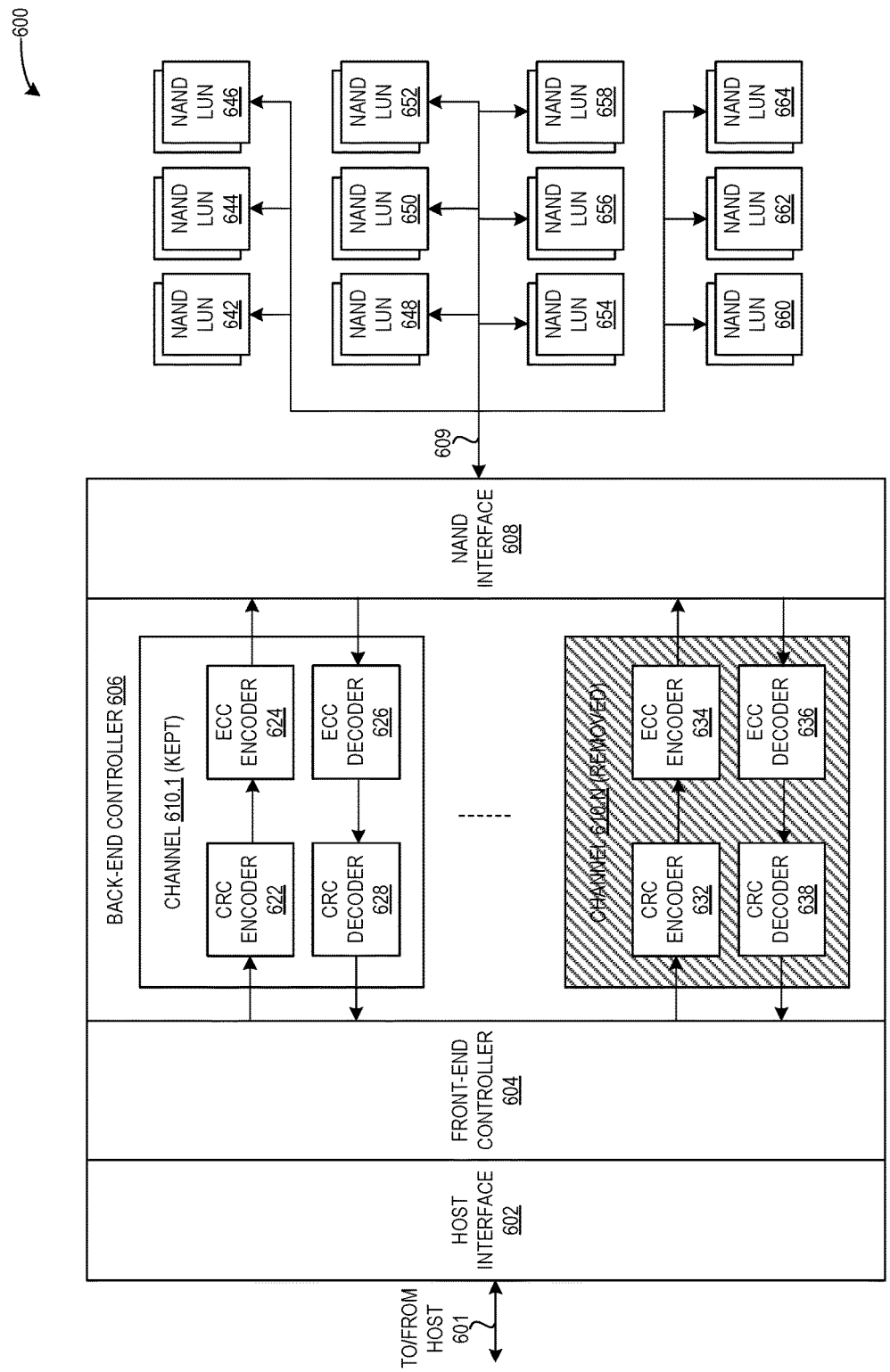
FIG. 6 illustrates an exemplary architecture for facilitating data backup on a storage device, in accordance with an embodiment of the present application.

FIG. 6 illustrates an exemplary architecture 600 for facilitating data backup on a storage device, in accordance with an embodiment of the present application. Architecture 600 can indicate a storage device, such as an SSD, and can include: a host interface 602 which communicates via a communication 601 with a host; a front-end controller 604; a back-end controller 606 with a channel 610.1; and a NAND interface 608 which communicates via a communication 609 with NAND logical units (LUNs) 642-644. Back-end controller 606 depicts channels which have been removed (as compared to a conventional or prior art architecture associated with the system described above in FIGS. 2 and 3). For example, back-end controller 606 depicts a channel 610.N which has been removed. Because of the reduced number of encoding and decoding operations of the embodiments described herein (that is, on the ECC decoder, the CRC decoder, the ECC encoder, and the CRC encoder), the parallelism of channels as designed in a controller may also be reduced for a decreased cost (e.g., based on a lesser amount of silicon required for the controller). Thus, the embodiments described herein provide a system which facilitates an improved method for backing up data, and which also results in a reduced overall system cost.

Method for Facilitating Data Backup on a Storage Device

Figure 7A:
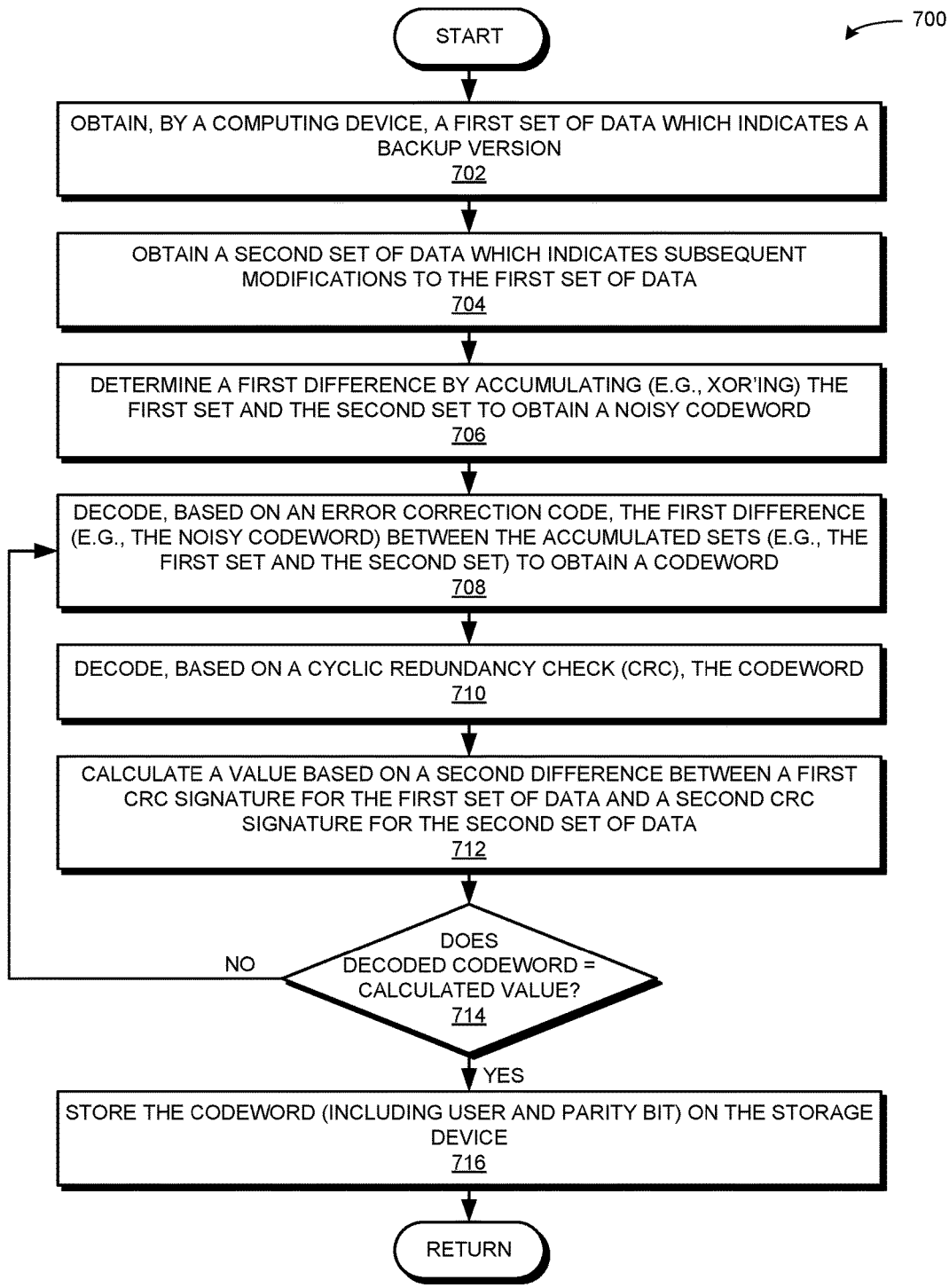
FIG. 7A presents a flowchart illustrating a method for facilitating data backup on a storage device, including obtaining a difference between two data sets, in accordance with an embodiment of the present application.

FIG. 7A presents a flowchart 700 illustrating a method for facilitating data backup on a storage device, including obtaining a difference between two data sets, in accordance with an embodiment of the present application. During operation, the system obtains, by a computing device, a first set of data which indicates a backup version (operation 702). The system obtains a second set of data which indicates subsequent modifications to the first set of data (operation 704). The system determines a first difference by accumulating (e.g., performing a bit-wise XOR on) the first set and the second set to obtain a noisy codeword (operation 706). The system decodes, based on an error correction code, the first difference (i.e., the noisy codeword) between the accumulated sets (e.g., the first set and the second set) to obtain a codeword (operation 708). The system decodes, based on a cyclic redundancy check (CRC), the codeword (operation 710). The system calculates a value based on a second difference between a first CRC signature for the first set of data and a second CRC signature for the second set of data (operation 712). The system obtains the second difference based on a bit-wise XOR of the first signature and the second signature, and further calculates the value based on a polynomial division of the second difference.

If the decoded codeword from operation 710 matches the calculated value from operation 712 (decision 714) (e.g., based on a bitwise check), the system stores the codeword (including user and parity bits) on the storage device (operation 716). If the decoded codeword does not match the calculated value (decision 714), the system re-reads the data (e.g., as in operations 702 and 704) to obtain a new first difference or noisy codeword (e.g., as in operation 706), or adjusts the noisy codeword (e.g., as in operation 706) to obtain a new first difference or noisy codeword before continuing at operation 708. The system iterates through the ECC-decoding until the CRC comparison values match (as in decision 714).

Figure 7B:
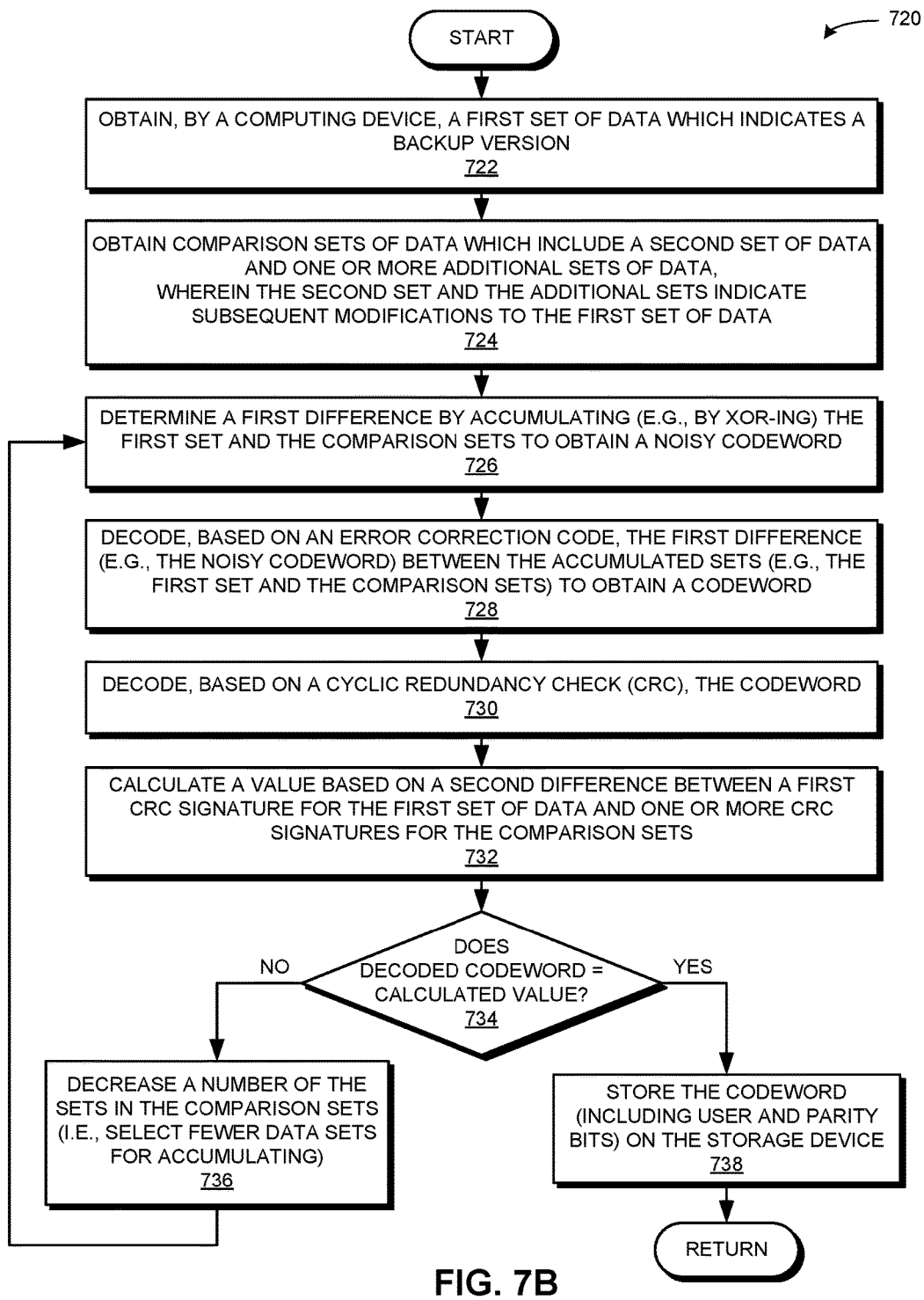
FIG. 7B presents a flowchart illustrating a method for facilitating data backup on a storage device, including rebuilding a full backup using differences between data sets, in accordance with an embodiment of the present application.

FIG. 7B presents a flowchart 720 illustrating a method for facilitating data backup on a storage device, including rebuilding a full backup using differences between data sets, in accordance with an embodiment of the present application. During operation, the system obtains, by a computing device, a first set of data which indicates a backup version (operation 722). The system obtains comparison sets of data which include a second set of data and one or more additional sets of data, wherein the second set and the additional sets indicate subsequent modifications to the first set of data (operation 724). The comparison sets can indicate differences from the backup or reference version, as in an incremental or a differential backup. The system determines a first difference by accumulating (e.g., by performing a bit-wise XOR on) the first set and the comparison sets to obtain a noisy codeword (operation 726). The system decodes, based on an error correction code, the first difference (e.g., the noisy codeword) between the accumulated sets (e.g., the first set and the comparison sets) to obtain a codeword (operation 728). The system decodes, based on a cyclic redundancy check (CRC), the codeword (operation 730). The system calculates a value based on a second difference between a first CRC signature for the first set of data and one or more CRC signatures for the comparison sets (operation 732). The system obtains the second difference based on a bit-wise XOR of the first signature and the one or more signatures, and further calculates the value based on a polynomial division of the second difference.

If the decoded codeword from operation 730 matches the calculated value from operation 732 (decision 734) (e.g., based on a bitwise check), the system stores the codeword (including user and parity bits) on the storage device (operation 738). If the decoded codeword does not match the calculated value (decision 734), the system decreases a number of the sets in the comparison set (i.e., selects fewer data sets for accumulating) (operation 736) to obtain a new first difference or noisy codeword by returning to operation 726. The system iterates through the ECC-decoding until the CRC comparison values match (as in decision 734).

Exemplary Computer System and Apparatus

Figure 8:
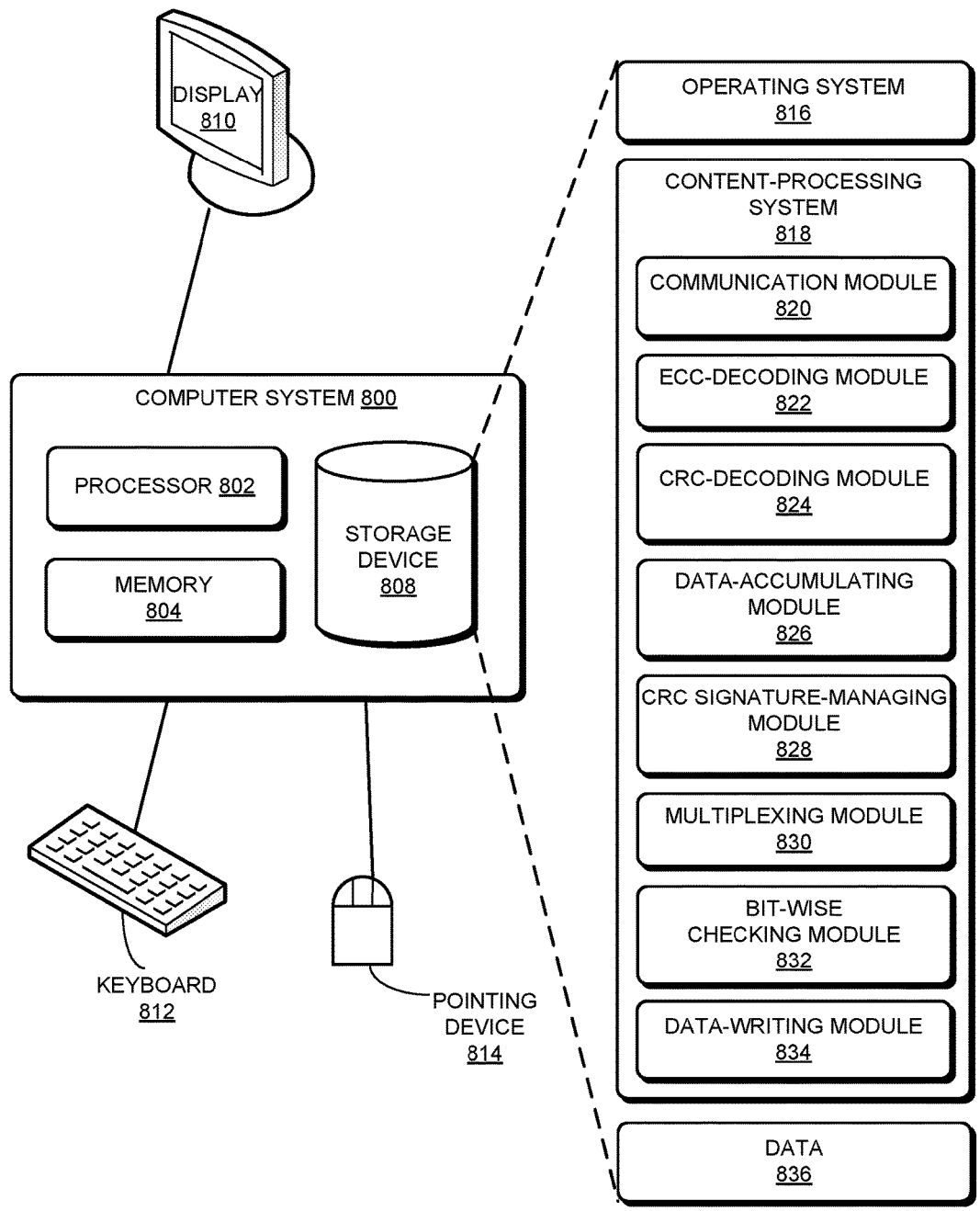
FIG. 8 illustrates an exemplary computer system that facilitates data backup on a storage device, in accordance with an embodiment of the present application.

FIG. 8 illustrates an exemplary computer system that facilitates data backup on a storage device, in accordance with an embodiment of the present application. Computer system 800 includes a processor 802, a memory 804, and a storage device 808. Computer system 800 may be computing device or a storage device. Memory 804 can include a volatile memory (e.g., RAM) that serves as a managed memory, and can be used to store one or more memory pools. Furthermore, computer system 800 can be coupled to a display device 810, a keyboard 812, and a pointing device 814. Storage device 808 can store an operating system 816, a content-processing system 818, and data 836.

Content-processing system 818 can include instructions, which when executed by computer system 800, can cause computer system 800 to perform methods and/or processes described in this disclosure. For example, content-processing system 818 can include instructions for receiving and transmitting data packets, including a set of data in a host format or a storage media format, a request to write or read data, data to be encoded and stored, or a block of data. Content-processing system 818 can further include instructions for decoding, by a computing device, based on an error correction code, a first difference between a first and a second set of data to obtain a codeword (ECC-decoding module 822 and data-accumulating module 826). Content-processing system 818 can include instructions for calculating a value based on a second difference between a first signature for the first set of data and a second signature for the second set of data (CRC signature-managing module 828). Content-processing system 818 can also include instructions for, in response to determining that a decoding of the codeword based on a cyclic redundancy check (CRC-decoding module 824) matches the calculated value (bit-wise checking module 832), storing the codeword on the storage device (data-writing module 834).

Content-processing system 818 can additionally include instructions for determining an accumulated difference between the second set of data and one or more additional sets of data (data-accumulating module 826). Content-processing system 818 can include instructions for decoding, based on the error correction code, a third difference between the first set of data and the accumulated difference to obtain the codeword (ECC-decoding module 822). Content-processing system 818 can also include instructions for accumulating, by a multiplexing component, the second set of data and the one or more additional sets of data (multiplexing module 830).

Data 836 can include any data that is required as input or that is generated as output by the methods and/or processes described in this disclosure. Specifically, data 836 can store at least: data to be stored, retrieved, encoded, decoded, or processed; a first set of data which indicates a backup version; a second or additional set of data which indicates subsequent modifications to the backup version; a value; a difference between two sets of data; an accumulated difference between a set of data and a plurality of sets of data; a comparison value; a cyclic redundancy check (CRC); an error correction code (ECC); an encoding or a decoding based on a CRC or an ECC; a result of a bit-wise XOR or check; a polynomial; a result of a polynomial division; a signature; a CRC signature for a set of data; an order of accumulation; a number of additional sets of data; and a decreased number.

Figure 9:
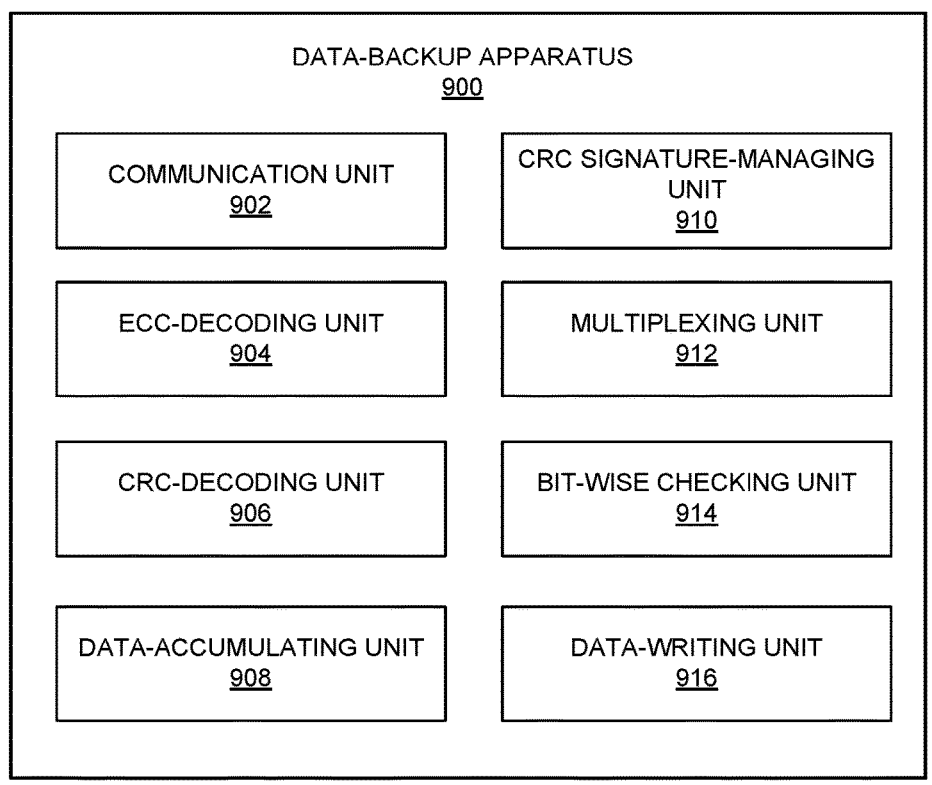
FIG. 9 illustrates an exemplary apparatus that facilitates data backup on a storage device, in accordance with an embodiment of the present application.

FIG. 9 illustrates an exemplary apparatus 900 that facilitates data backup on a storage device, in accordance with an embodiment of the present application. Apparatus 900 can comprise a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. Further, apparatus 900 may be integrated in a computer system, or realized as a separate device which is capable of communicating with other computer systems and/or devices. Specifically, apparatus 900 can comprise units 902-916 which perform functions or operations similar to modules 820-834 of computer system 800 of FIG. 8, including: a communication unit 902; an ECC-decoding unit 904; a CRC-decoding unit 906; a data-accumulating unit 908; a CRC-signature managing unit 910; a multiplexing unit 912; a bit-wise checking unit 914; and a data-writing unit 916.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating data backup on at least one storage device, the method comprising:
   decoding, by a computing device, based on an error correction code, a first difference between a first and a second set of data to obtain a codeword,
   wherein the first set of data indicates a backup version and the second set of data indicates subsequent modifications to the first set of data;
   calculating a value based on a second difference between a first signature for the first set of data and a second signature for the second set of data; and
   in response to determining that a decoding of the codeword based on a cyclic redundancy check matches the calculated value, storing the codeword on the at least one storage device.

2. The method of claim 1, further comprising:
   obtaining the first difference based on a bit-wise XOR of the first set of data and the second set of data.

3. The method of claim 1, further comprising:
   obtaining the second difference based on a bit-wise XOR of the first signature and the second signature,
   wherein calculating the value is further based on a polynomial division of the second difference.

4. The method of claim 1, wherein the first signature is a cyclic redundancy check signature for the first set of data, and
   wherein the second signature is a cyclic redundancy check signature for the second set of data.

5. The method of claim 1, wherein determining that the decoding of the codeword based on the cyclic redundancy check matches the calculated value is based on a bit-wise check between the decoded codeword and the calculated value.

6. The method of claim 1, further comprising:
   in response to determining that the decoding of the codeword based on the cyclic redundancy check does not match the calculated value, obtaining a newly decoded codeword by:
      reading the first set and the second set of data from the at least one storage device to obtain a new codeword, or adjusting the codeword or the new codeword; and
      decoding the codeword or the new codeword based on the error correction code; and
   in response to determining that a decoding of the newly decoded codeword based on the cyclic redundancy check matches the calculated value, storing the newly decoded codeword on the at least one storage device.

7. The method of claim 1, further comprising:
   determining an accumulated difference between the second set of data and one or more additional sets of data, wherein an additional set of data indicates subsequent modifications to the first set of data; and decoding, based on the error correction code, a third difference between the first set of data and the accumulated difference to obtain the codeword, wherein calculating the value is further based on one or more signatures for the one or more additional sets of data.

8. The method of claim 7, further comprising:

accumulating, by a multiplexing component, the second set of data and the one or more additional sets of data, wherein the multiplexing component is a switch which suspends the accumulation or modifies an order of the accumulation.

9. The method of claim 7, wherein the third difference is decoded prior to determining the accumulated difference between the second set of data and all of the additional sets of data.

10. The method of claim 7, further comprising:

in response to determining that the decoding of the codeword based on the cyclic redundancy check does not match the calculated value, decoding, based on the error correction code, a fourth difference between the second set of data and a decreased number of the additional sets of data to obtain a newly decoded codeword, wherein calculating the value is further based on corresponding signatures for the decreased number of the additional sets of data; and in response to determining that a decoding of the newly decoded codeword based on the cyclic redundancy check matches the calculated value, storing the newly decoded codeword on the at least one storage device.

11. A computer system for facilitating a backup of data on at least one storage component of the computer system, the computer system comprising:

a processor; and a memory coupled to the processor and storing instructions, which when executed by the processor cause the processor to perform a method comprising:

decoding, by the computer system, based on an error correction code, a first difference between a first and a second set of data to obtain a codeword, wherein the first set of data indicates a backup version and the second set of data indicates subsequent modifications to the first set of data;

calculating a value based on a second difference between a first signature for the first set of data and a second signature for the second set of data; and in response to determining that a decoding of the codeword based on a cyclic redundancy check matches the calculated value, storing the codeword on the at least one storage component.

12. The computer system of claim 11, wherein the method further comprises:

obtaining the first difference based on a bit-wise XOR of the first set of data and the second set of data.

13. The computer system of claim 11, wherein the method further comprises:

obtaining the second difference based on a bit-wise XOR of the first signature and the second signature, wherein calculating the value is further based on a polynomial division of the second difference.

14. The computer system of claim 11, wherein the first signature is a cyclic redundancy check signature for the first set of data, and wherein the second signature is a cyclic redundancy check signature for the second set of data.

15. The computer system of claim 11, wherein determining that the decoding of the codeword based on the cyclic redundancy check matches the calculated value is based on a bit-wise check between the decoded codeword and the calculated value.

16. The computer system of claim 11, wherein the method further comprises:

in response to determining that the decoding of the codeword based on the cyclic redundancy check does not match the calculated value, obtaining a newly decoded codeword by:

reading the first set and the second set of data from the at least one storage component to obtain a new codeword, or adjusting the codeword or the new codeword; and decoding the codeword or the new codeword based on the error correction code; and in response to determining that a decoding of the newly decoded codeword based on the cyclic redundancy check matches the calculated value, storing the newly decoded codeword on the at least one storage component.

17. The computer system of claim 11, wherein the method further comprises:

determining an accumulated difference between the second set of data and one or more additional sets of data, wherein an additional set of data indicates subsequent modifications to the first set of data; and decoding, based on the error correction code, a third difference between the first set of data and the accumulated difference to obtain the codeword, wherein calculating the value is further based on one or more signatures for the one or more additional sets of data.

18. The computer system of claim 17, wherein the method further comprises:

accumulating, by a multiplexing component, the second set of data and the one or more additional sets of data, wherein the multiplexing component is a switch which suspends the accumulation or modifies an order of the accumulation.

19. The computer system of claim 17, wherein the third difference is decoded prior to determining the accumulated difference between the second set of data and all of the additional sets of data.

20. The computer system of claim 17, wherein the method further comprises:

in response to determining that the decoding of the codeword based on the cyclic redundancy check does not match the calculated value, decoding, based on the error correction code, a fourth difference between the second set of data and a decreased number of the additional sets of data to obtain a newly decoded codeword, wherein calculating the value is further based on corresponding signatures for the decreased number of the additional sets of data; and in response to determining that a decoding of the newly decoded codeword based on the cyclic redundancy check matches the calculated value, storing the newly decoded codeword on the at least one storage component.

* * * * *